United States Patent [19]
Hwang

[11] Patent Number: 5,565,761
[45] Date of Patent: Oct. 15, 1996

[54] SYNCHRONOUS SWITCHING CASCADE CONNECTED OFFLINE PFC-PWM COMBINATION POWER CONVERTER CONTROLLER

[76] Inventor: Jeffrey H. Hwang, 20576 Manor Dr., Saratoga, Calif. 95070

[21] Appl. No.: 300,475

[22] Filed: Sep. 2, 1994

[51] Int. Cl.[6] ............................................. G05F 1/656
[52] U.S. Cl. ........................................ 323/222; 323/282
[58] Field of Search .................................. 323/222, 223, 323/224, 282, 284, 288; 363/21, 23, 25

[56] References Cited

U.S. PATENT DOCUMENTS

| | | | |
|---|---|---|---|
| 4,731,574 | 3/1988 | Melbert | 323/282 |
| 4,736,151 | 4/1988 | Dishner | 323/222 |
| 5,278,490 | 1/1992 | Smedley | 323/282 |
| 5,412,308 | 5/1995 | Brown | 323/222 |
| 5,457,622 | 10/1995 | Arakawa | 323/222 |
| 5,461,302 | 10/1995 | Garcia et al. | 323/222 |

*Primary Examiner*—Matthew V. Nguyen
*Attorney, Agent, or Firm*—Haverstock & Associates

[57] ABSTRACT

A synchronous switching cascade connected power converter includes a first power factor correction converter stage and a second DC to DC converter stage for generating an output voltage in response to an input voltage and current. The output voltage is controlled by a circuit which measures a level of current within the circuit, compares that level to a predetermined desired level, and develops a response elsewhere in the circuit. Leading edge modulation for the first stage and trailing edge modulation for the second stage is implemented to realize synchronous switching between the two power stages. A single reference clock signal is used to control both the power stages. The duty cycle of the first stage is varied according to the input voltage. The duty cycle of the second stage is ideally held constant at fifty percent but will vary as the input voltage to this stage varies. A dc ok comparator is coupled to the first stage for comparing an output voltage to a threshold value and preventing the second stage from turning on if the output voltage of the first stage is below the threshold value. A transconductance amplifier is used to control the input current and the output voltage of the power stages. A circuit for capturing a portion of the voltage lost due to the parasitic capacitances of the switches is also included. This capturing stage is coupled to the switch to capture voltage discharged by the parasitic capacitance and use it to then charge the output capacitor of the converter stage.

23 Claims, 12 Drawing Sheets

SYNCHRONOUS SWITCHING CASCADE CONNECTED OFFLINE PFC-PWM COMBINATION POWER CONVERTER CONTROLLER

FIELD OF THE INVENTION

This invention generally relates to the field of cascade power converters. More particularly, the present invention relates to the field of two stage, AC to DC power converters which include a power factor correction converter.

BACKGROUND OF THE INVENTION

Switching mode power converters of the prior art, as illustrated in FIG. 1, produce large harmonic current, generating interference in communication circuits and may also produce excessive neutral current, hot spots in the transformer, resonance, inaccuracies in the instrumentation, misoperation of relays and voltage distortion in the power distribution system. With the increase of such nonlinear loads connected to the power grid, efficient techniques for power factor correction (PFC) are increasingly sought after to deliver more power to the load at a constant level.

For switching mode power converters the output voltage is controlled by an electronic circuit which measures a level of electric current within the circuit, compares that measured level to a predetermined desired level, and develops a response to that measurement elsewhere in the circuit in order to more accurately achieve the desired level. A boost converter power stage of the prior art is illustrated in FIG. 1. The input voltage VIN is coupled to the input terminals 10 and 12. The input terminal 10 is coupled to a first terminal of the inductor L1. A second terminal of the inductor L1 is coupled to the positive terminals of the switches SW1 and SW2. The switch control voltage SCV1 is coupled to control the switch SW1 and to the input of the inverter 18. The output of the inverter 18 is coupled as the switch control voltage SCV2 for controlling the switch SW2. The capacitor C1 is coupled between the negative terminals of the switches SW1 and SW2. The load RL is coupled across the capacitor C1 and the output voltage VOUT can be measured across the output terminals 14 and 16. This power stage is designed so that when the switch SW1 is closed, the switch SW2 is open and when the switch SW1 is open, the switch SW2 is closed.

The boost converter of FIG. 1 converts the input voltage VIN to a desired output voltage VOUT. The voltage VIN is applied to a pair of terminals 10 and 12 of the boost power stage. The input voltage VIN is turned on and turned off relative to the boost power stage by alternately closing and opening the switches SW1 and SW2. The switches SW1 and SW2 are controlled by the switch control voltage signals SCV1 and SCV2. The circuit is designed so that when the switch SW1 is open, the switch SW2 is closed and when the switch SW1 is closed, the switch SW2 is open. The input voltage VIN is isolated from the load RL by the inductor L1 so that the switching noise is not readily coupled to the input line.

The output voltage VOUT is established by integrating the inductor current in the LC filter network. This integrated current is supplied to the load circuit as the converted output voltage VOUT. In order to establish the proper output voltage from a given input voltage, the input voltage VIN is switched in and out of the circuit by the switches SW1 and SW2. The resulting oscillating signal is integrated in the LC network to form the desired output voltage VOUT. If the input voltage VIN changes or varies over time, the frequency at which the switches SW1 and SW2 are opened and closed can also be varied in order to maintain the desired output voltage VOUT.

When the switch SW1 is open and the switch SW2 is closed the input voltage VIN is connected to the remainder of the circuitry and the inductor current IL rises linearly until it reaches the peak current level. When the inductor current IL reaches the peak current level, the switch SW1 is closed, the switch SW2 is open and the inductor current IL decreases at a linear rate. The linear rise and fall rates for the inductor current IL need not be the same. Once the current has fallen to the minimum level, the circuit is "turned on", by opening the switch SW1 and closing the switch SW2, and the cycle is then repeated. The output voltage VOUT is equal to the average of the inductor current IL multiplied by the load resistance RL. The inductor current IL is integrated by the LC network forming the output voltage VOUT.

The boost converter, as illustrated in FIG. 1, is typically used in power factor correction circuits of the prior art because the input current flows through an inductor and is therefore relatively smooth and easy to control. However, since the input instantaneous power does not equal the output instantaneous power, the intermediate stage consisting of the capacitor C1 must be installed to store the excess instantaneous power temporarily. Because the system typically must interface with a universal input such as an offline AC source, the capacitor C1 must have the ability to sustain a very high output voltage of approximately 380 VDC. Such capacitors are typically very expensive. Isolation of the boost converter is difficult to implement because such a high PFC output voltage is required. In order to implement isolation of the boost converter, a second stage comprising a step down power converter with isolation is required.

The cascade connection of power stages is a very effective and powerful tool in the design of state-of-the-art high frequency switching mode power converters. Power factor corrected power supplies offer improved performance when compared to ordinary off-line switching power supplies. However, the system stability of such power factor corrected power supplies needs special care.

Systems which contain a right hand zero are referred to as non-minimum phase systems. It is difficult to compensate for a cascade power stages system, because of the right hand zero and the two close poles which are caused by a momentary no load. For example in the single boost power converter stage illustrated in FIG. 1, the load of this stage RL is continuously connected to the output stage. Because the load RL is also part of the output filter, it is very important to the switching power converter. Reduction of the load will cause the poles due to the inductor and the capacitor to become closer and thus reduce the phase margin.

A cascade connection of two power stages is illustrated in FIG. 2. The input voltage VIN is coupled to the terminals 20 and 22. The terminal 20 is coupled to a first terminal of the inductor L1. The second terminal of the inductor L1 is coupled to the positive terminals of the switches SW1 and SW2. The switch control voltage SCV1 is coupled to control the switch SW1 and to the input of the inverter 28. The output of the inverter 28 is coupled as the switch control voltage SCV2 for controlling the switch SW2. The capacitor C1 is coupled between the negative terminals of the switches SW1 and SW2. The positive terminal of the switch SW3 is coupled to the capacitor C1 and the negative terminal of the switch SW2. The negative terminal of the switch SW3 is coupled to the positive terminal of the switch SW4 and to a first terminal of the inductor L2. The capacitor C2 is coupled between a second terminal of the inductor L2 and the negative terminal of the switch SW4. The switch control voltage SCV3 is coupled to control the switch SW3 and to the input of the inverter 30. The output of the inverter 30 is coupled as the switch control voltage SCV4 for controlling the switch SW4. The load RL is coupled across the capacitor C2 and the output voltage VOUT can be measured across the terminals 24 and 26.

In the cascade power stage, as illustrated in FIG. 2, the load RL could be momentary and not constant, causing periods when there is no load. Without the load connected to the power stage, the system will oscillate and cannot maintain a constant output voltage VOUT. Many systems of the prior art attempt to reduce the no load period by speeding up the loop response for the second stage. A second, faster clock, is typically used to speed up the response of the second stage, causing the system to become more complicated.

A trailing edge modulation control scheme is illustrated in FIG. 3. The converter stage of this trailing edge scheme is the same as the converter stage of FIG. 1 with the addition of the switch control circuitry 31. A reference voltage REF is coupled to the positive input of the error amplifier U3. The negative or inverting input of the error amplifier U3 is coupled to the potentiometer PT1. The output VEAO of the error amplifier is coupled as the positive input of the comparator U1. The negative input of the comparator U1 is coupled to the ramp output of the oscillator U4. The output of the comparator U1 is coupled as the reset input R of the flip flop U2. The input D of the flip flop U2 is coupled to the output $\overline{Q}$. The clock input CLK of the flip flop U2 is coupled to the clock output of the oscillator U4. The output Q of the flip flop U2 is coupled to control the operation of the switch SW1.

Pulse width modulation (PWM) is a technique used to maintain a constant output voltage VOUT when the input voltage does not remain constant and varies over time. By changing the frequency at which the switches are opened and closed, as the input voltage changes, the output voltage VOUT can be maintained at a constant level as desired. The inductor current IL is stored as a voltage level on the plates of the capacitor C1. Because of its parallel connection to the output of the circuit, the voltage across the capacitor C1 is equivalent to the output voltage VOUT and the voltage across the potentiometer PT1. A fraction of that voltage is measured from the potentiometer PT1 forming the voltage VEA which is input into the negative terminal of the error amplifier and is compared to the reference voltage REF. This comparison determines how close the actual output voltage VOUT is to the desired output voltage.

Conventional pulse width modulation techniques use the trailing edge of the clock signal, so that the switch will turn on right after the trailing edge of the system clock. FIGS. 4, 5 and 6 show corresponding voltage waveforms with respect to time of different voltage levels at different points within the switch control circuitry 31. The time axis for the FIGS. 4, 5 and 6 has been drawn to correspond in all three figures. FIG. 4 illustrates the voltage levels with respect to time of the error amplifier output VEAO and the modulating ramp output of the oscillator U4. FIG. 5 illustrates the voltage level of the switch SW1 with respect to time. The switch SW1 is at a high voltage level when it is "on" or closed. The switch SW1 is at a low voltage level when it is "off" or open. FIG. 6 illustrates the clock impulses with respect to time of the clock output of the oscillator U4.

The switch SW1 will turn on after the trailing edge of the system clock. Once the switch SW1 is on, the modulator then compares the error amplifier output voltage and the modulating ramp; when the modulating ramp reaches the error amplifier output voltage, the switch will be turned off. When the switch is on, the inductor current will ramp up. The effective duty cycle of the trailing edge modulation is determined during the on time of the switch. FIG. 3 illustrates a typical trailing edge control scheme using a single boost power converter stage. As the input voltage VIN varies over time, the duty cycle or time that the switch SW1 is on will vary in order to maintain a constant output voltage VOUT.

A leading edge modulation control scheme is illustrated in FIG. 7. The difference between the circuit of FIG. 3 and the circuit of FIG. 7 is that the reference voltage in the circuit of FIG. 7 is coupled to the negative input of the error amplifier U3 and the voltage VEA from the potentiometer PT1 is coupled to the positive input of the error amplifier U3. FIGS. 8, 9 and 10 show corresponding voltage waveforms with respect to time. FIG. 8 illustrates the voltage levels with respect to time of the error amplifier output VEAO and the ramp output of the oscillator U4 for the leading edge modulation circuit of FIG. 7. FIG. 9 illustrates the voltage level of the switch SW1 with respect to time. The switch SW1 is at a high voltage level when it is "on" or closed. The switch SW1 is at a low voltage level when it is "off" or open. FIG. 10 illustrates the clock impulses with respect to time.

In the case of leading edge modulation, the switch SW1 is turned off after the leading edge of the system clock; when the modulating ramp reaches the level of the error amplifier output voltage VEAO, the switch will be turned on. The effective duty cycle of the leading edge modulation is determined during the off time of the switch. FIG. 7 shows a typical leading edge control scheme using a single boost power converter stage. While the voltage waveforms for the switch SW1 shown in FIGS. 5 and 9 show a constant duty cycle for the switch SW1, as the input voltage VIN varies over time, the time that the switch SW1 is on or closed, will vary in order to maintain a constant output voltage VOUT level.

Ripple voltage is a quantity used to measure the amount of AC voltage introduced into the DC output voltage. If the boost-buck cascade power converter as illustrated in FIG. 2 is used as the offline PFC-PWM power converter, the ripple voltage of the PFC output stage can be separated into two portions. The first portion is due to the voltage drop across the ESR which corresponds to the capacitor C1 and C2. The second portion of the ripple voltage is due to the change in voltage with respect to time across the capacitor C1. Prior art schemes control the switches SW1 and SW3 with two separate clock signals, so that the switch SW1 and the switch SW3 are opened and closed at different times. If both converters are in the continuous conduction mode (CCM) and the conventional trailing edge modulation scheme with two different clocks controlling the switches SW1 and SW3 is used, the ripple voltage is $$\text{Total Ripple Voltage} = I_{2max} \times ESR + 0.433 \times \frac{I_{2max}}{C1 \times fsw} \quad (1)$$

Where, the maximum current $I_{2max}$ through a closed switch SW2 is equal to $$I_{2max} = \frac{\text{Avg. Input Power} \times \sqrt{2}}{\text{efficiency} \times Vin\ rms} \quad (2)$$

When the input phase is equal to 60 degrees, the change in voltage dV across the capacitor C1 reaches a maximum if the second portion of the ripple voltage which corresponds to the change in voltage across the capacitor C1 is dominant.

Each of the switches used has an associated parasitic capacitance which causes a loss of the power transferred to the output circuit. The parasitic capacitance of the switch builds up a stored voltage when the switch is open. This voltage is then discharged when the switch is closed, causing a loss of the power that was stored in the parasitic capacitance of the switch.

What is needed is a synchronous switching method for a cascade connected power converter which utilizes a single clock reference signal and reduces the ripple voltage in order to facilitate more efficient power usage and lower harmonic content in the line current. What is further needed is a method for capturing a portion of the voltage lost due to the parasitic capacitances of the switches.

SUMMARY OF THE INVENTION

A synchronous switching two-stage cascade connected power converter includes a first power factor correction boost converter stage and a second DC to DC converter stage for generating an output voltage in response to an input voltage and current. The output voltage is controlled by an electronic circuit which measures a level of electric current within the circuit, compares that measured level to a predetermined desired level, and develops a response to that measurement elsewhere in the circuit. Leading edge modulation for the first power factor correction boost converter stage and trailing edge modulation for the second DC to DC converter stage is implemented to realize synchronous switching between the two power stages. A single reference clock signal is used to control both the first and the second converter stages. The duty cycle of the first power stage is varied according to the input voltage in order to maintain a constant output voltage. The duty cycle of the second power stage is ideally held constant at fifty percent but will vary as the input voltage to this power stage varies. A dc ok comparator is coupled to the first stage for comparing an output voltage of the first stage to a threshold value and preventing the second stage from turning on if the output voltage of the first stage is below the threshold value. A transconductance amplifier is used to control the input current and the output voltage of the power stages.

A circuit for capturing a portion of the voltage lost due to the parasitic capacitances of the switches is also included. This capturing stage is coupled to the switch to capture the voltage discharged by the parasitic capacitance and use this voltage to then charge the output capacitor of the converter stage.

DETAILED DESCRIPTION OF THE PREFERRED EMBODIMENT

Figure 1:
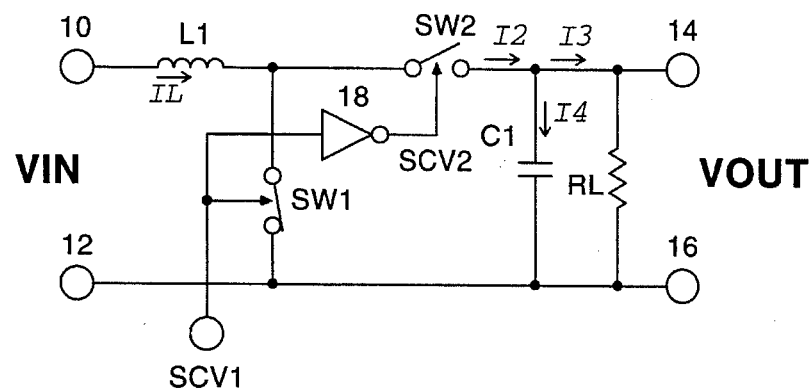
FIG. 1 illustrates a schematic diagram for a switching mode boost power converter of the prior art.

A cascade power converter of the present invention, as illustrated in FIG. 1, uses a synchronous switching scheme and controls the switches SW1 and SW3 with a single system clock signal. The difference between the power converter of FIG. 11 and the power converter of FIG. 2 is that the switches SW1 and SW3 are turned on or off at the same time in order to minimize the momentary no load period and reduce the ripple voltage delivered to the load RL.

Figure 11:
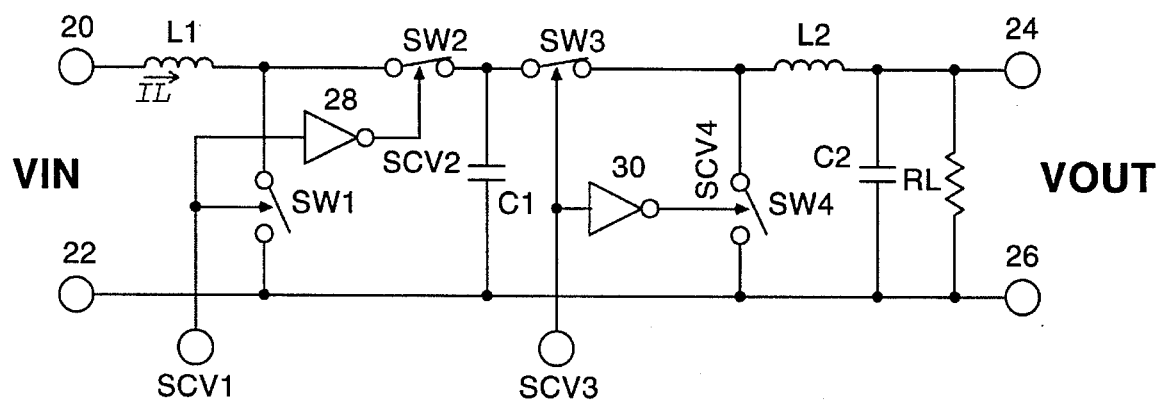
FIG. 11 illustrates a synchronous switching cascade power converter of the present invention.

The ripple voltage for the cascade power converter of FIG. 11 is equal to $$\text{Total Ripple Voltage} = (I_{2max} - I_3) \times ESR + 0.433 \times \frac{I_{2max} - I_3}{C1 \times f_{sw}} \quad (3)$$

Figure 2:
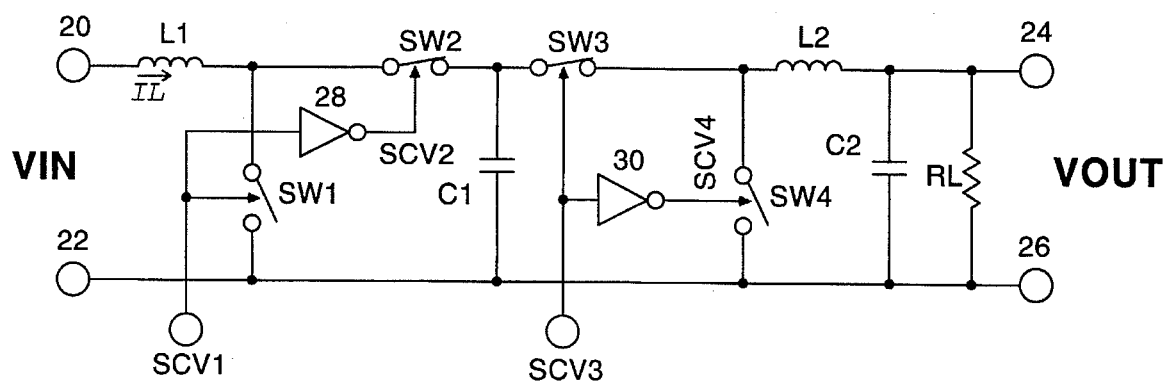
FIG. 2 illustrates a schematic diagram of a cascade connection of two power stages.
Figure 3:
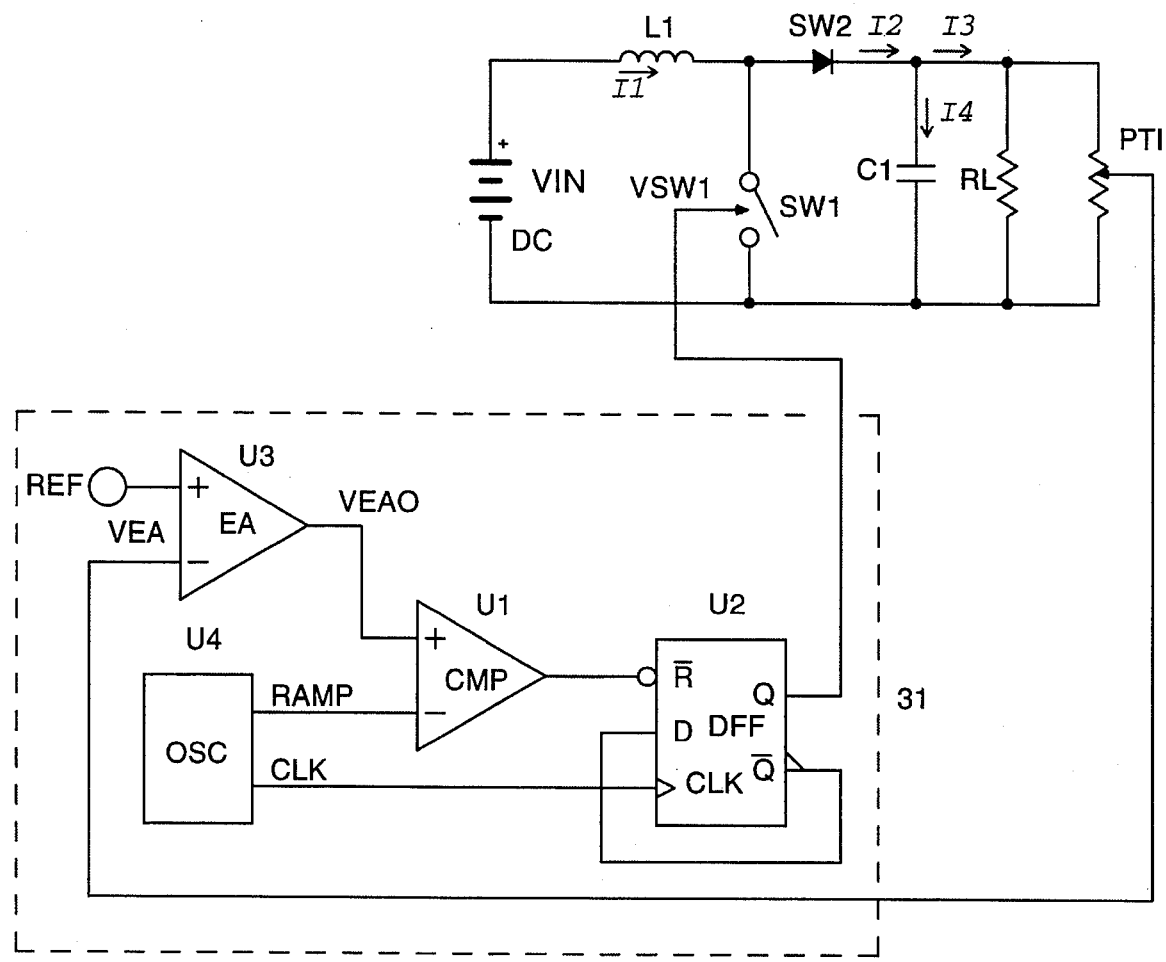
FIG. 3 illustrates a trailing edge modulation control scheme of the prior art.
Figure 4:
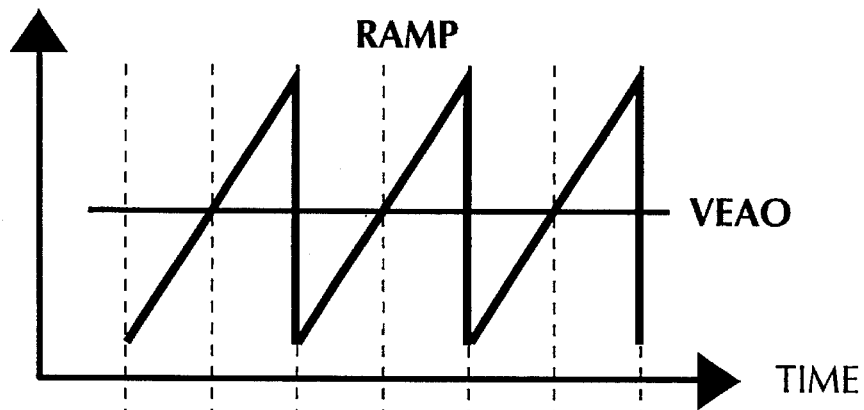
FIG. 4 illustrates the voltage levels with respect to time of the error amplifier output and the ramp output of the oscillator for the trailing edge modulation circuit of FIG. 3.
Figure 5:
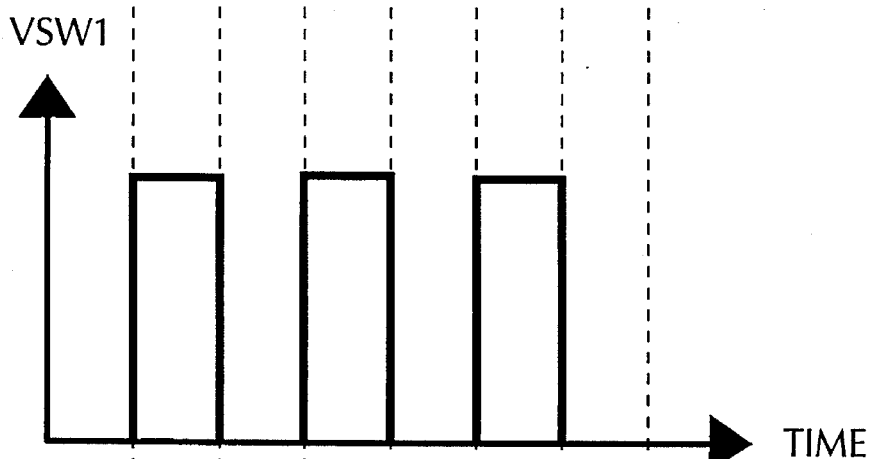
FIG. 5 illustrates the voltage level of the switch SW1 with respect to time.
Figure 6:
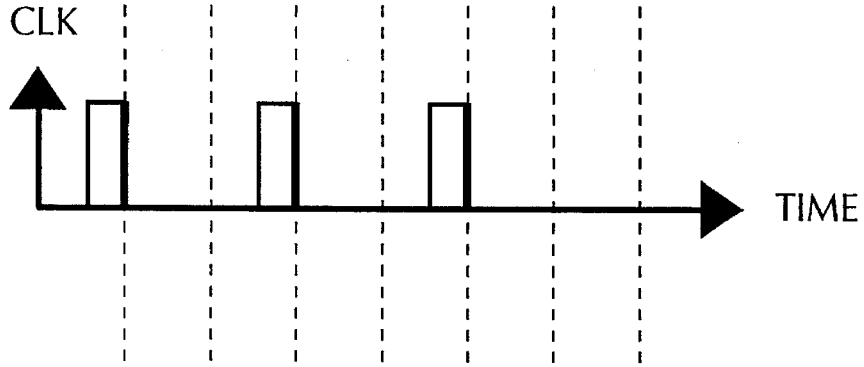
FIG. 6 illustrates the clock impulses with respect to time of the clock output of the oscillator.
Figure 7:
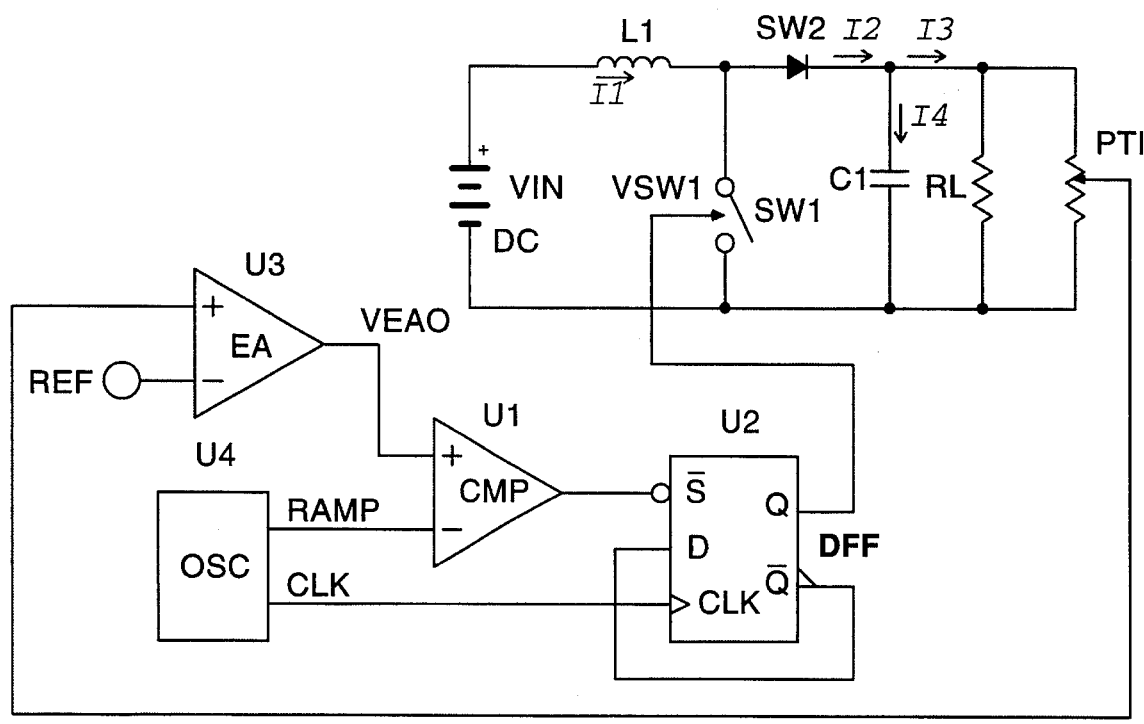
FIG. 7 illustrates a leading edge modulation control scheme of the prior art.
Figure 8:
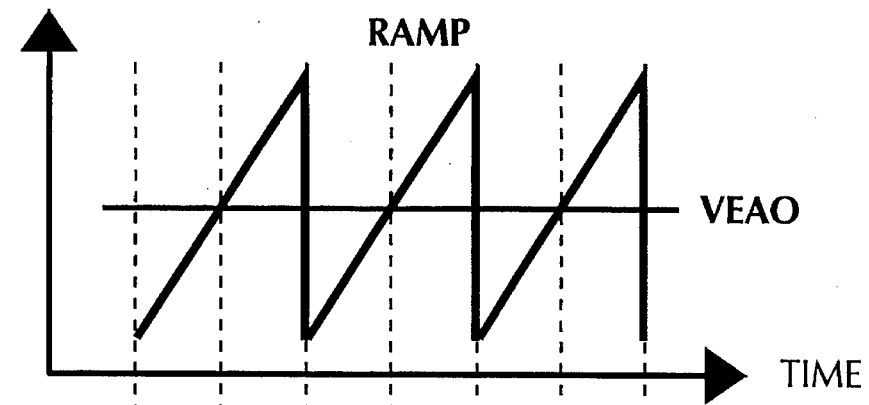
FIG. 8 illustrates the voltage levels with respect to time of the error amplifier output and the ramp output of the oscillator for the leading edge modulation circuit of FIG. 7.
Figure 9:
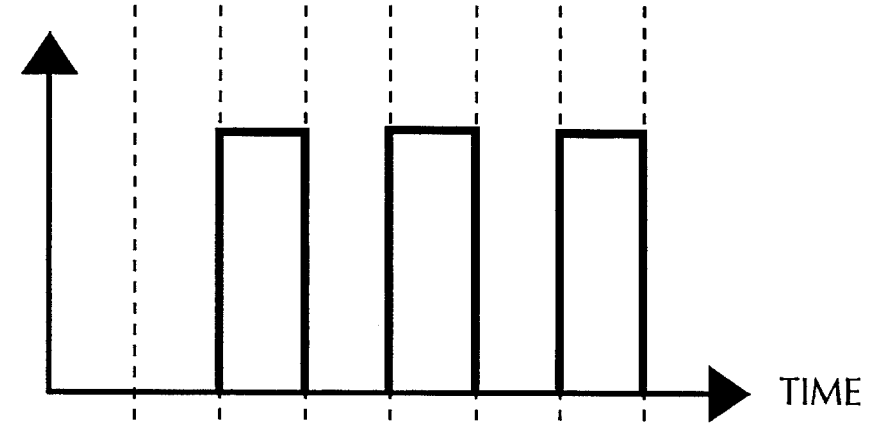
FIG. 9 illustrates the voltage level of the switch SW1 with respect to time.
Figure 10:
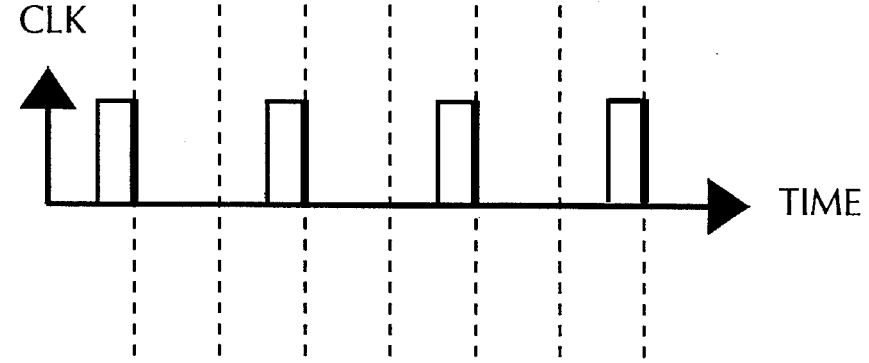
FIG. 10 illustrates the clock impulses with respect to time of the clock output of the oscillator.

Therefore the total ripple voltage is reduced from the cascade power converter of FIG. 2, because everywhere the current $I_{2max}$ was used in the equation (1), that value is replaced by the value $(I_{2max} - I_3)$ in the equation (3).

Figure 12:
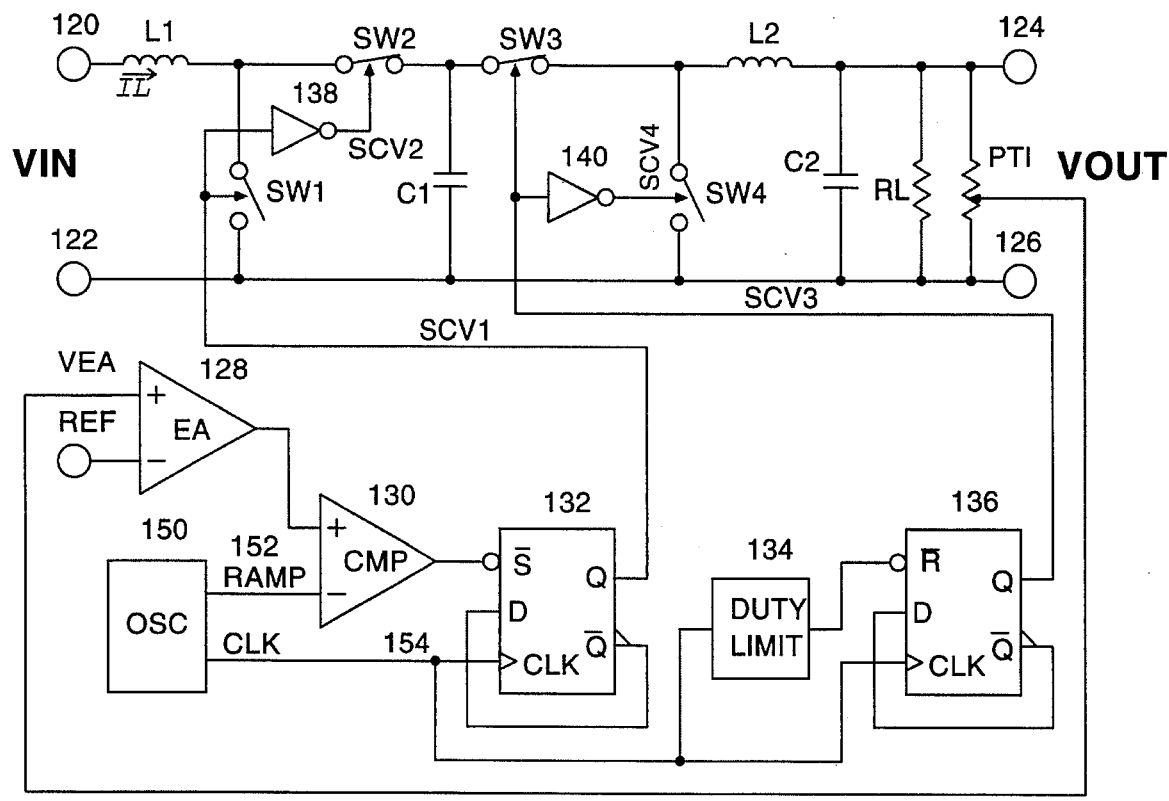
FIG. 12 illustrates a schematic of a synchronous switching two-stage cascade power converter of the present invention including switch control circuitry.

A schematic of a synchronous switching, two-stage cascade connected, offline PFC-PWM power converter, designed according to the present invention, is illustrated in FIG. 12. The first stage of the power converter illustrated in FIG. 12 uses a leading edge modulation control scheme which controllably varies the duty cycle of the switches SW1 and SW2 in order to maintain a constant output voltage VOUT. The second stage of the power converter uses a trailing edge modulation scheme in which the duty cycle of the switches SW3 and SW4 is ideally held constant, but will vary as necessary if the input voltage to the second stage, as measured across the capacitor C1, varies.

The function of the power factor correction first stage is to ensure that the current follows the voltage in time and amplitude proportionally. This means that for a steady-state constant output power condition, the amplitude of the current waveform will follow the amplitude of the voltage waveform in the same proportion at any instant in time. Therefore, when the voltage amplitude is at its maximum, the current amplitude will also be at its maximum. Correspondingly, when the voltage amplitude is at half of its maximum value, the current amplitude will also be at half of its maximum value. This proportional relationship results in a sinusoidal current waveform which is in phase with the incoming sinusoidal voltage waveform.

The voltage control loop for this stage is forced to have a slow response in order to allow the current to follow the voltage because the first stage is concerned with current processing, and the frequency of the current is related to the line frequency. This slow voltage loop response makes necessary the addition of the second power stage for faster and more accurate voltage processing.

Figure 13A:
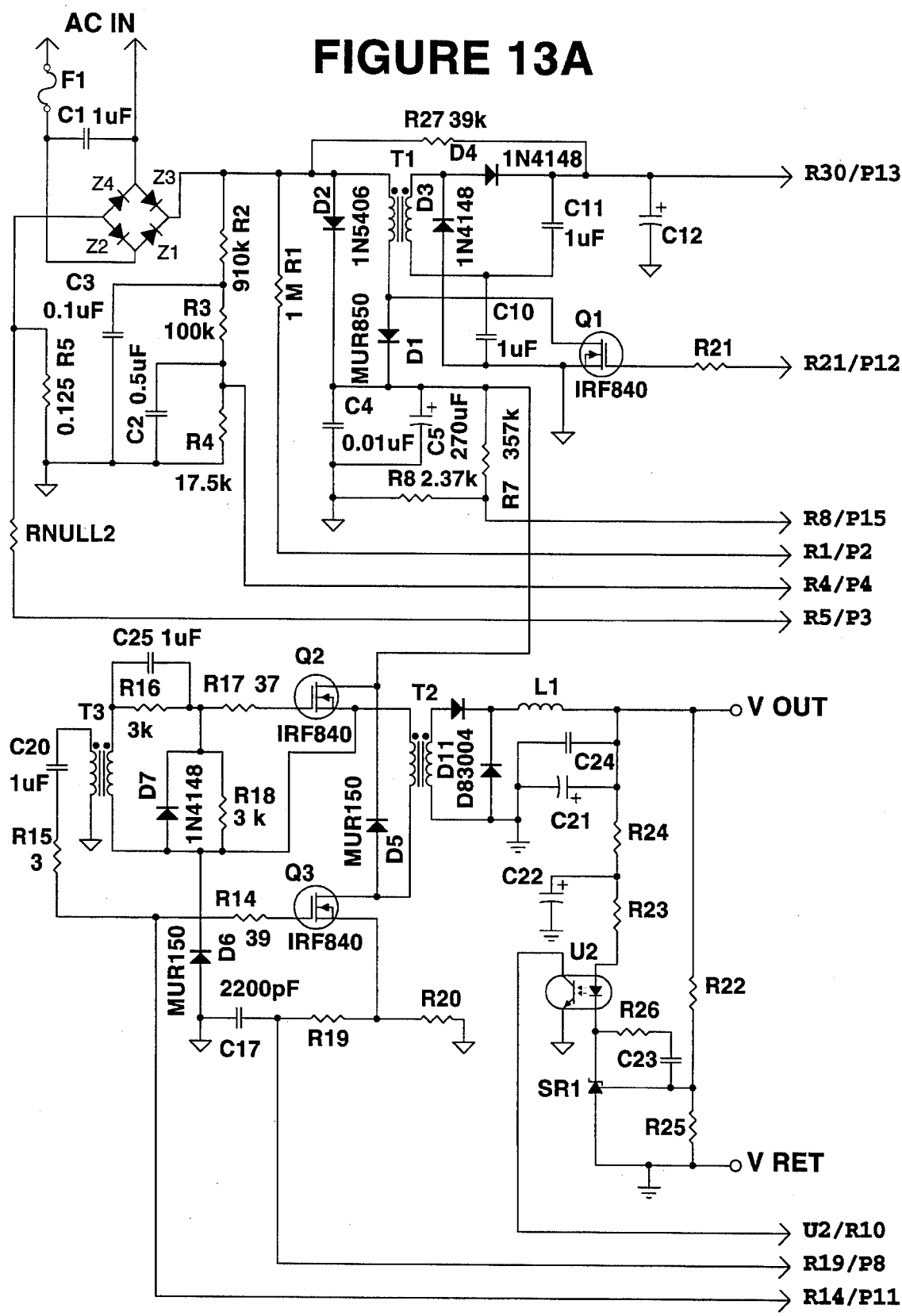
FIG. 13 illustrates a detailed schematic of a synchronous switching two-stage cascade power converter of the present invention including switch control circuitry.
Figure 13B:
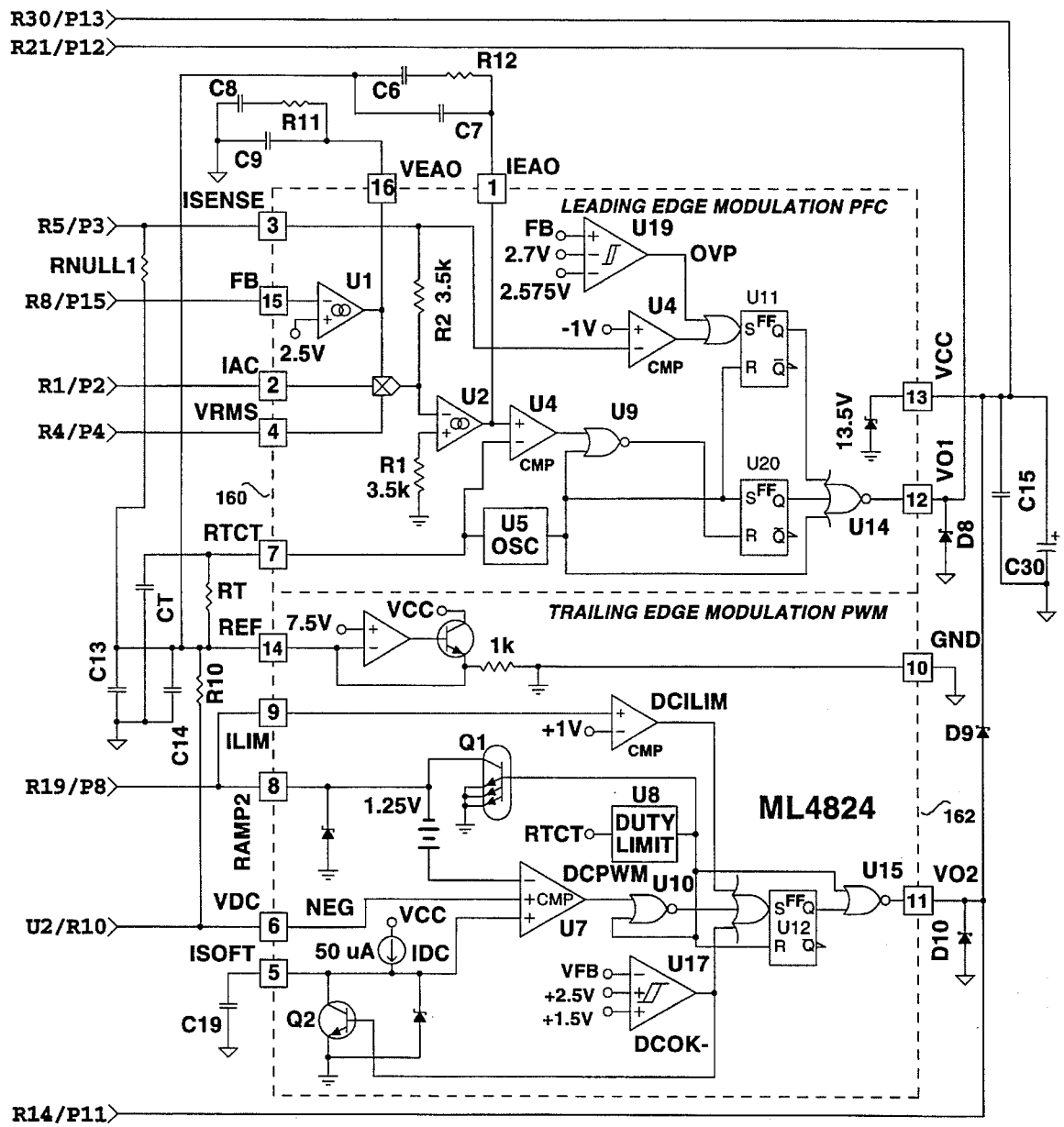
Figure 15:
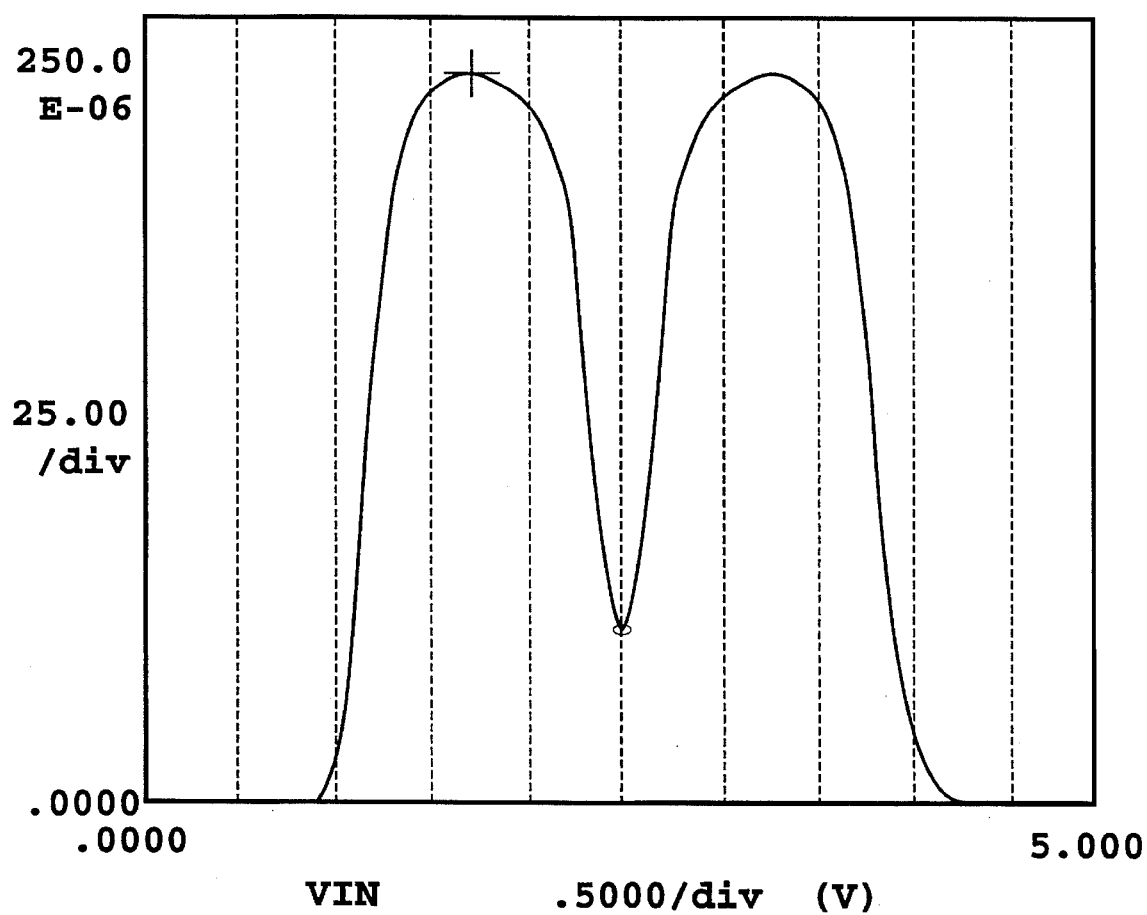
FIG. 15 illustrates the transconductance characteristics for the voltage transconductance amplifier U1.
Figure 16:
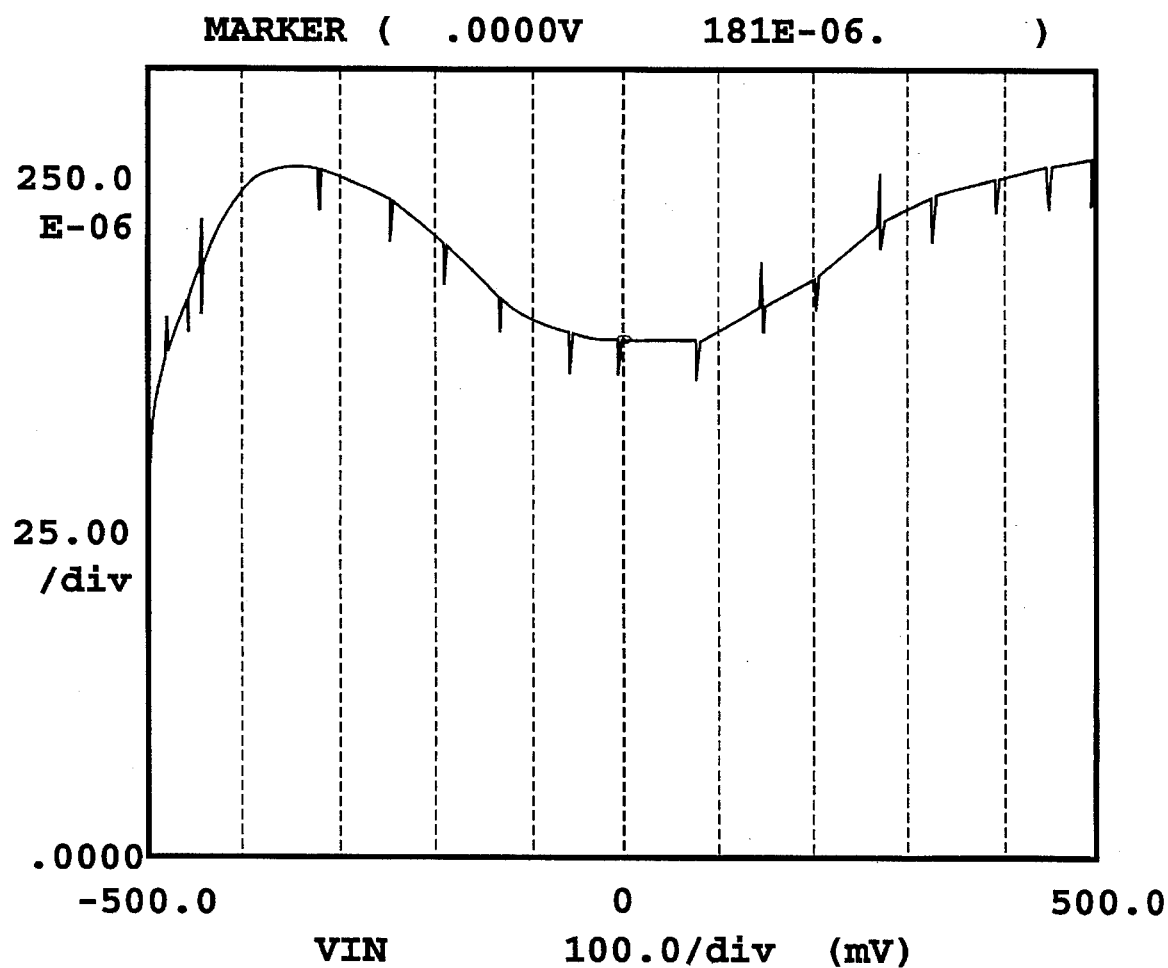
FIG. 16 illustrates the transconductance characteristics for the current transconductance amplifier U2.

Two transconductance amplifiers U1 and U2, as illustrated in the circuit of FIG. 13, are utilized within this control loop. The transconductance amplifiers U1 and U2 exhibit low transconductance when the inputs of the amplifiers are balanced. When these inputs become unbalanced the transconductance will increase. These transconductance amplifiers U1 and U2 do not require local feedback compensation. During transient operation, due to the transconductance amplifiers U1 and U2, the response of the voltage control loop will be forced to speed up. The transconductance characteristics for the transconductance amplifier U1 are illustrated in FIG. 15. The transconductance characteristics for the transconductance amplifier U2 are illustrated in FIG. 16.

In the power converter of FIG. 12, the input voltage VIN is coupled to the input terminals 120 and 122. The input terminal 120 is coupled to a first terminal of the inductor L1. The second terminal of the inductor L1 is coupled to the positive terminals of the switches SW1 and SW2. The negative terminal of the switch SW1 is coupled to the input terminal 122. The negative terminal of the switch SW2 is coupled to a first terminal of the capacitor C1 and the positive terminal of the switch SW3. A second terminal of the capacitor C1 is coupled to the input terminal 122. The negative terminal of the switch SW3 is coupled to the positive terminal of the switch SW4 and a first terminal of the inductor L2. The negative terminal of the switch SW4 is coupled to the input terminal 122. The second terminal of the inductor L2 is coupled to a first terminal of the capacitor C2, a first terminal of the load resistance RL, a first terminal of the potentiometer PT1 and the output terminal 124. The second terminal of the capacitor C2, the second terminal of the resistor RL, the second terminal of the potentiometer PT1 and the output terminal 126 are all coupled to the input terminal 122. The output voltage VOUT is measured across the output terminals 124 and 126.

The output voltage VEA from the potentiometer PT1 is coupled to the positive input of the error amplifier 128. A reference voltage REF is coupled as the negative or inverting input of the error amplifier 128. The output VEAO from the error amplifier 128 is coupled as the positive input to the comparator 130. The ramp output of the oscillator 150 is coupled as the negative input to the comparator 130. The output of the comparator 130 is coupled to the S input of the flip-flop 132. The $\overline{Q}$ output of the flip-flop 132 is coupled as the D input of the flip-flop 132. The clock signal output 154 from the oscillator 150 is coupled as the clock input CLK of the flip-flop 132. The Q output of the flip-flop is the switch control voltage SCV1 and is coupled as the control voltage to the switch SW1 and is also coupled as the input to the inverter 138. The output of the inverter 138 is coupled as the switch control voltage SCV2 to the switch SW2.

The clock output signal 154 from the oscillator 150 is coupled to the input of the duty limit circuit 134 for determining the "on" time of the switch SW3 and to the clock input CLK of the flip-flop 136. The output of the duty limit circuit 134 is coupled as the R input of the flip-flop 136. The $\overline{Q}$ output of the flip-flop 136 is coupled as the D input of the flip-flop 136. The Q output of the flip-flop 136 is the switch control voltage SCV3 and is coupled as the control voltage to the switch SW3 and also as the input to the inverter 140. The output of the inverter 140 is coupled as the switch control voltage SCV4 to the switch SW4.

During the start up of the system or after a momentary interruption of the load, time is required to allow the circuit to reach its maximum power. If not enough time has been allowed, then the instantaneous output may demand more power than the first stage can provide during start up, thus causing the first stage to shut down. For this reason, the output voltage of the power factor correction first stage is monitored by a dc ok comparator. If the output of the first stage is less than 380 volts d.c. then the pulse width modulation second stage will not be permitted to turn on or will be momentarily stopped. Once the output level of the first stage reaches 380 volts d.c. then the second stage will be allowed to turn on.

A detailed schematic of a 200 Watt offline synchronous switching two-stage cascade power converter of the present invention, including switch control circuitry, is illustrated in FIG. 13. The leading edge control circuitry for controlling the first stage of the power converter is shown within the reference box 160. The trailing edge control circuitry for controlling the second stage of the power converter is shown within the reference box 162. The transconductance amplifiers U1 and U2 are illustrated within the reference box 160. The dc ok comparator U17 is illustrated within the reference box 162.

Figure 14:
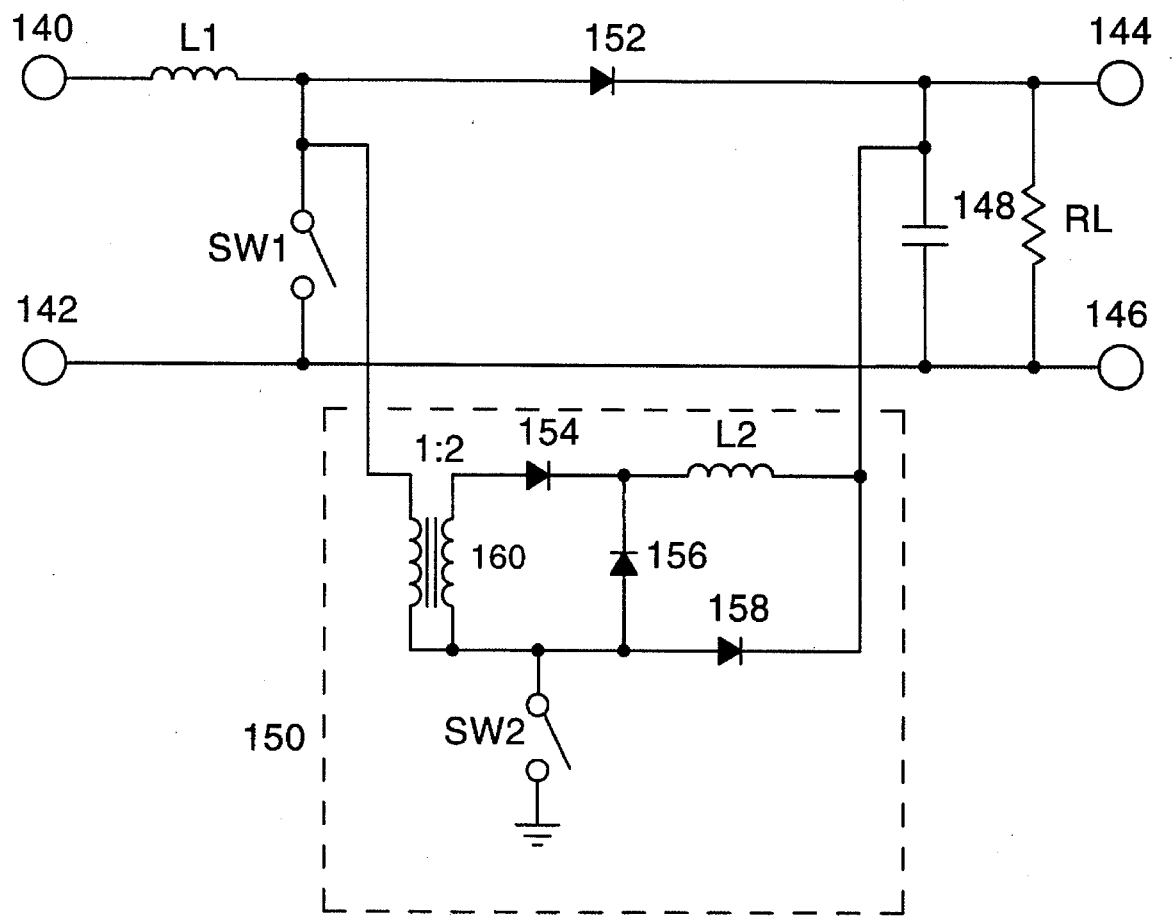
FIG. 14 illustrates a schematic including a capturing circuit for capturing a portion of the voltage lost across the parasitic capacitance of a switch.

A capturing circuit for capturing a portion of the voltage lost across the parasitic capacitance of the switch is illustrated in FIG. 14. The capturing circuit 150 includes the transformer 160, the inductor L2, the diodes 154, 156 and 158 and the switch SW2. A first primary terminal of the transformer 160 is coupled to the second terminal of the inductor L1. A first secondary terminal of the transformer 160 is coupled to the anode of the diode 154. The cathode of the diode 154 is coupled to the cathode of the diode 156 and to a first terminal of the inductor L2. A second primary terminal of the transformer 160 is coupled to the second secondary terminal of the transformer 160, to a first terminal of the switch SW2, to the anode of the diode 156 and to the anode of the diode 158. A second terminal of the inductor L2 is coupled to the cathode of the diode 158, to the cathode of the diode 152, to the first terminal of the capacitor 148 and to the output terminal 144.

When the switch SW1 is open, the switch SW2 is closed so that the current bypasses the parasitic capacitance of the switch SW1 and is stored in the inductor L2. Then, when the switch SW1 is closed, the switch SW2 is open and the current stored in the inductor L2 is used to charge the capacitor 148, thus recapturing the power that would be lost due to the parasitic capacitance of the switch SW1.

The switch SW2 also has an associated parasitic capacitance and thus loses power due to that parasitic capacitance. A second capturing circuit could be coupled to the first capturing circuit in order to capture a portion of the power lost due to the parasitic capacitance of the switch SW2. A plurality of capturing circuits can be coupled together in a cascade fashion in order to capture a bigger portion of the power lost due to the parasitic capacitance of the switches. As will be apparent to one of ordinary skill in the art after a number of these circuits are coupled together the size and cost of the circuit does not justify the amount of power saved by the capturing circuits.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, while the cascade converter of the present invention preferably includes two stages, it should be apparent to one skilled in the art that more than two stages could be coupled together in a cascade fashion according to the present invention. While preferably a boost power converter stage is implemented in the power converter of the present invention it should be apparent to one skilled in the art that other types of power converters could be used, including buck, buck-boost or flyback.

I claim:

1. A synchronous switching cascade connected power converter for generating an output voltage in response to an input voltage, comprising:
   a. means for receiving an input voltage;
   b. a first power factor correction converter stage coupled to the means for receiving and including a first switch;
   c. at least one or more additional converter stages coupled in cascade to the first power factor correction converter stage, each additional converter stage having a switch; and
   d. means for controlling the switches coupled to the first switch, the switch of each additional stage and the output voltage for synchronously switching the first switch and the switch of each additional stage in response to a single clock reference signal, the first switch having a first varying duty cycle which is controlled by the means for controlling and varies in response to changes in the input voltage for maintaining a constant output voltage, the switches of each of the additional stages having a second fixed duty cycle which is also controlled by the means for controlling.

2. The synchronous switching cascade connected power converter as claimed in claim 1 further comprising a comparator coupled to the first stage for comparing an output voltage of the first stage to a threshold value, wherein the comparator prevents the additional stages from turning on if the output voltage of the first stage is below the threshold value.

3. The synchronous switching cascade connected power converter as claimed in claim 2 further comprising means for capturing a portion of power lost due to the switch of each additional power converter stage, the means for capturing coupled to the first switch and to the switch of each converter stage.

4. The synchronous switching cascade connected power converter as claimed in claim 3 wherein the means for capturing comprises a first plurality of capturing circuits, each coupled to the first switch and the switch of each additional converter stage and wherein the first plurality each include a switch.

5. The synchronous switching cascade connected power converter as claimed in claim 4 wherein the means for capturing further comprises a second plurality of capturing circuits coupled to the first plurality of capturing circuits for capturing a portion of the power lost due to the switches of the first plurality.

6. The synchronous switching cascade connected power converter as claimed in claim 5 wherein only one additional converter stage is coupled to the first power factor correction converter stage.

7. The synchronous switching cascade connected power converter as claimed in claim 6 wherein the input voltage is an AC voltage, the first power factor correction converter stage is an AC to DC converter stage and the additional converter stage is a DC to DC converter.

8. The synchronous switching cascade connected power converter as claimed in claim 7 wherein the first stage is a boost converter stage.

9. The synchronous switching cascade connected power converter as claimed in claim 8 wherein the additional converter stage further comprises a first transconductance amplifier and a second transconductance amplifier, the second transconductance amplifier coupled to the first transconductance amplifier and to the output voltage for speeding up a loop response of the second stage.

10. The synchronous switching cascade connected power converter as claimed in claim 1 wherein leading edge modulation is used to vary the first variable duty cycle of the first switch and trailing edge modulation is used to maintain the second fixed duty cycle of the second switch at a constant value.

11. A synchronous switching cascade connected power converter for generating an output voltage in response to an input voltage, comprising:
   a. a first power factor correction converter stage coupled to the input voltage and to the output voltage, including a first switch having a first parasitic capacitance, in which leading edge modulation is used to vary a first variable duty cycle of the first switch relative to a level of the input voltage in order to maintain a constant output voltage;
   b. a second converter stage coupled in cascade to the first power factor correction converter stage and coupled to the output voltage, including a second switch having a second parasitic capacitance, in which trailing edge modulation is used to maintain a second constant duty cycle of the second switch;
   c. a comparator coupled to the first stage for comparing the output voltage of the first stage to a threshold value and preventing the second stage from turning on if the output voltage of the first stage is less than the threshold value;
   d. control circuitry coupled to the first power factor correction converter stage and to the second converter stage for controlling the first variable duty cycle of the first switch and the second constant duty cycle of the second switch so that the first switch and the second switch are synchronously controlled by a single clock reference signal; and
   e. a capturing circuit coupled to the first switch and to the second switch for capturing a portion of power lost due to the first and second parasitic capacitances.

12. A synchronous switching cascade connected power converter comprising:
   a. means for receiving an input voltage;
   b. a first power factor correction converter stage coupled to the means for receiving and including a first switch;
   c. at least one additional converter stage coupled in cascade to the first power factor correction converter stage, each additional converter stage having a switch; and
   d. means for synchronously controlling the first switch and the switch of each additional stage for maintaining a constant output voltage.

13. The synchronous switching cascade connected power converter as claimed in claim 12 further comprising first means for capturing a portion of power lost due to the first switch, the first means for capturing coupled to the first switch.

14. The synchronous switching cascade connected power converter as claimed in claim 13 further comprising second means for capturing a portion of power lost due to the switch of each additional converter stage, the second means for capturing coupled to the switch of each additional converter stages.

15. The synchronous switching cascade connected power converter as claimed in claim 12 wherein a last stage of the at least one additional converter stages forms the output voltage.

16. The synchronous switching cascade connected power converter as claimed in claim 15 wherein the input voltage is an AC voltage, the first stage is an AC to DC converter stage and the last stage is a DC to DC converter.

17. The synchronous switching cascade connected power converter as claimed in claim 16 further comprising a comparator coupled to the first stage for comparing an output voltage of the first stage to a threshold value.

18. The synchronous switching cascade connected power converter as claimed in claim 17 wherein the comparator prevents the last stage from turning on if the output voltage of the first stage is below the threshold value.

19. The synchronous switching cascade connected power converter as claimed in claim 18 wherein the first stage is a boost converter stage.

20. The synchronous switching cascade connected power converter as claimed in claim 19 wherein the last stage further comprises a first transconductance amplifier and a second transconductance amplifier, the second transconductance amplifier coupled to the first transconductance amplifier and to the output voltage for speeding up a loop response of the last stage.

21. The synchronous switching cascade connected power converter as claimed in claim 15 wherein the switch of the first stage has a first variable duty cycle and the switch of the last stage has a second fixed duty cycle.

22. The synchronous switching cascade connected power converter as claimed in claim 21 wherein the means for synchronously switching comprises control circuitry for controlling the first variable duty cycle and the second fixed duty cycle.

23. The synchronous switching cascade connected power converter as claimed in claim 15 wherein the means for synchronously controlling comprises a clock circuit for forming a periodic clock signal wherein leading edge modulation is used to control the first switch and trailing edge modulation is used to control the switch of the last stage.

* * * * *

UNITED STATES PATENT AND TRADEMARK OFFICE
CERTIFICATE OF CORRECTION

PATENT NO. : 5,565,761
DATED : October 15, 1996
INVENTOR(S) : Jeffrey Hwang

It is certified that error appears in the above-identified patent and that said Letters Patent is hereby corrected as shown below:

In column 7, line 11, "This-slow" should have been typed --This slow--.

In column 8, line 44, "terminal Of" should have been typed --terminal of--.

Signed and Sealed this

Eleventh Day of February, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,565,761

DATED : October 15, 1996

INVENTOR(S) : Jeffrey H. Hwang

It is certified that error appears in the above-indentified patent and that said Letters Patent is hereby corrected as shown below:

On the title page, between item "[75] Inventors:" and item "[21] Appl. No.:", insert the following item:
--[73] Assignee: Micro Linear Corporation, San Jose, Calif.--

Signed and Sealed this

Twelfth Day of October, 1999

Attest:

Q. TODD DICKINSON

*Attesting Officer*    *Acting Commissioner of Patents and Trademarks*